(12) United States Patent
Rho

(10) Patent No.: US 7,369,193 B2
(45) Date of Patent: May 6, 2008

(54) COLOR FILTER PANEL, MANUFACTURING METHOD THEREOF AND TRANSFLECTIVE LIQUID CRYSTAL DISPLAY INCLUDING THE SAME

(75) Inventor: Soo-Guy Rho, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 253 days.

(21) Appl. No.: 10/724,910

(22) Filed: Dec. 1, 2003

(65) Prior Publication Data
US 2004/0114071 A1    Jun. 17, 2004

(30) Foreign Application Priority Data
Dec. 2, 2002    (KR) ................. 10-2002-0075870

(51) Int. Cl.
G02F 1/1335    (2006.01)
G02F 1/1333    (2006.01)

(52) U.S. Cl. ............... 349/106; 349/110; 349/114
(58) Field of Classification Search ........... 349/114, 349/106, 110
See application file for complete search history.

(56) References Cited

U.S. PATENT DOCUMENTS 6,008,872 A    12/1999    den Boer et al.
6,567,139 B2*    5/2003    Huang ................. 349/110
6,597,420 B2*    7/2003    Kim et al. ............. 349/106
6,757,038 B2*    6/2004    Itoh et al. ............. 349/113
6,850,298 B2*    2/2005    Fujimori et al. ....... 349/114
2003/0160918 A1*    8/2003    Rho ...................... 349/113

FOREIGN PATENT DOCUMENTS

JP    2000267081    9/2000

(Continued)

OTHER PUBLICATIONS

English Abstract for Japanese Publication No. 2000267081.

(Continued)

Primary Examiner—David Nelms
Assistant Examiner—David Chung
(74) Attorney, Agent, or Firm—F. Chau & Associates, LLC

(57) ABSTRACT

A transflective liquid crystal display including upper and lower panels facing each other. A plurality of gate lines and a plurality of data lines intersecting each other are formed on the lower panel to define pixel areas arranged in a matrix. A plurality of thin film transistors connected to the gate lines and the data lines and a plurality of pixel electrodes connected to the thin film transistors are also provided on the lower panel. Each pixel electrode includes a transparent electrode and a reflecting electrode with high reflectance having a transmitting window. A black matrix having apertures opposite the pixel areas and a plurality of red, green and blue color filters are formed on the upper panel, and a passivation layer covers the color filters. The passivation layer includes thicker and thinner portions, and the thinner portion is disposed opposite the transmitting window.

8 Claims, 14 Drawing Sheets

FOREIGN PATENT DOCUMENTS

| | | |
|---|---|---|
| JP | 2001281648 | 10/2001 |
| KR | 1020010055636 | 7/2001 |
| KR | 1020010062353 | 7/2001 |
| KR | 1020020012794 | 2/2002 |
| KR | 1020020032854 | 5/2002 |
| KR | 1020020051858 | 6/2002 |

OTHER PUBLICATIONS

English Abstract for Japanese Publication No. 2001281648.
English Abstract for Korean Publication No. 1020010055836.
English Abstract for Korean Publication No. 1020010062353.
English Abstract for Korean Publication No. 1020020012794.
English Abstract for Korean Publication No. 1020020032854.
English Abstract for Korean Publication No. 1020020051858.

* cited by examiner

A COLOR FILTER PANEL, MANUFACTURING METHOD THEREOF AND TRANSFLECTIVE LIQUID CRYSTAL DISPLAY INCLUDING THE SAME

BACKGROUND (a) Technical Field

The present disclosure relates to a color filter panel and a liquid crystal display including the same, particularly a color filter panel and a transflective liquid crystal display including the same.

(b) Disclosure of Related Art

Liquid crystal displays ("LCDs") are one of the most prevalent flat panel displays. Conventional LCDs include two panels having field-generating electrodes and a liquid crystal layer interposed between the two panels. The LCD controls the transmittance of light passing through the liquid crystal layer by adjusting voltages applied to the electrodes to re-arrange liquid crystal molecules in the liquid crystal layer.

The transmittance of light is determined by phase retardation generated by optical characteristics of liquid crystal material in the liquid crystal layer when the light passes through the liquid crystal layer. The phase retardation can be controlled by adjusting the refraction index anisotropy of the liquid crystal material and the distance between the two panels.

Conventional LCDs typically have electrodes on the respective panels and have a plurality of thin film transistors ("TFTs") for switching the voltages applied to the electrodes. Generally, the TFTs are provided on one of the two panels.

LCDs can be classified into a transmissive type, which displays images by transmitting light from a light source through the liquid crystal layer, or a reflective type, which displays images by reflecting external light, such as natural light, into the liquid crystal layer using a reflector. A transflective type LCD operates in both a transmissive mode and a reflective mode.

A conventional LCD is equipped with red, green and blue color filters to achieve color displays. Color images are obtained by controlling the light transmittance through the respective red, green and blue color filters.

The transflective type LCD has display characteristics due to the difference in phase retardation of the light passing through the liquid crystal layer that occurs between the transmissive mode and the reflective mode of the LCD. The light in the transmissive mode passes through the liquid crystal layer only once to reach a viewer, while the light in the reflective mode passes twice through the liquid crystal layer.

SUMMARY OF THE INVENTION

A color filter panel for a liquid crystal display according to an embodiment of the present invention includes a substrate, a color filter formed over the substrate, and a passivation layer that covers the color filter and that has a varying thickness.

According to an embodiment of the present invention, the liquid crystal display includes a first display area that displays images using a light source provided therein and a second display area that displays images using an external light. Preferably, the thickness of the passivation layer in the first display area is smaller than the thickness of the passivation layer in the second display area, and the thickness of the passivation layer in the first display area can be zero (0). It is preferable that the thickness of the color filter in the first display area is larger than the thickness of the color filter in the second display area.

The color filter preferably includes a first portion and a second portion, and the thickness of the color filter in the first portion is larger than in the second portion. The color filter panel may further include a black matrix located near the edge of the color filter. In at least one embodiment of the invention, the color filter further includes a third portion located near the edge of the color filter. The thickness of the color filter in the third portion is larger than the thickness of the color filter in the first portion, and at least a part of the third portion of the color filter overlaps the black matrix.

According to an embodiment of the present invention, the color filter panel further includes a common electrode formed over the substrate.

A transflective liquid crystal display according to an embodiment of the invention includes a first display panel and a second display panel opposite the first display panel. The first display panel includes a passivation layer having a varying thickness. The second display panel includes a field-generating electrode. The field-generating electrode includes a transparent electrode and a reflecting electrode formed over the transparent electrode. The reflecting electrode has an opening.

The passivation layer preferably includes a first portion with a first thickness and a second portion with a second thickness larger than the first thickness, and the first portion is opposite the opening. The first thickness of the passivation layer in the first portion can be zero (0).

According to an embodiment of the present invention, the reflecting electrode has embossments.

Preferably, the second panel further includes a gate line, a data line and a thin film transistor electrically connected to the gate line, the data line and the transparent electrode.

According to an embodiment of the present invention, the first display panel further includes a color filter having a varying thickness. The liquid crystal display may further include a black matrix located near the edge of the color filter.

BRIEF DESCRIPTION OF THE DRAWINGS

The present invention will become more apparent by describing preferred embodiments thereof in detail with reference to the accompanying drawings in which.

DETAILED DESCRIPTION OF THE PREFERRED EMBODIMENTS

The present invention now will be described more fully hereinafter with reference to the accompanying drawings, in which preferred embodiments of the invention are shown. The invention may, however, be embodied in many different forms and should not be construed as limited to the embodiments set forth herein.

An LCD according to an embodiment of the present invention is described in detail with reference to FIGS. 1 and 2.

Figure 1:
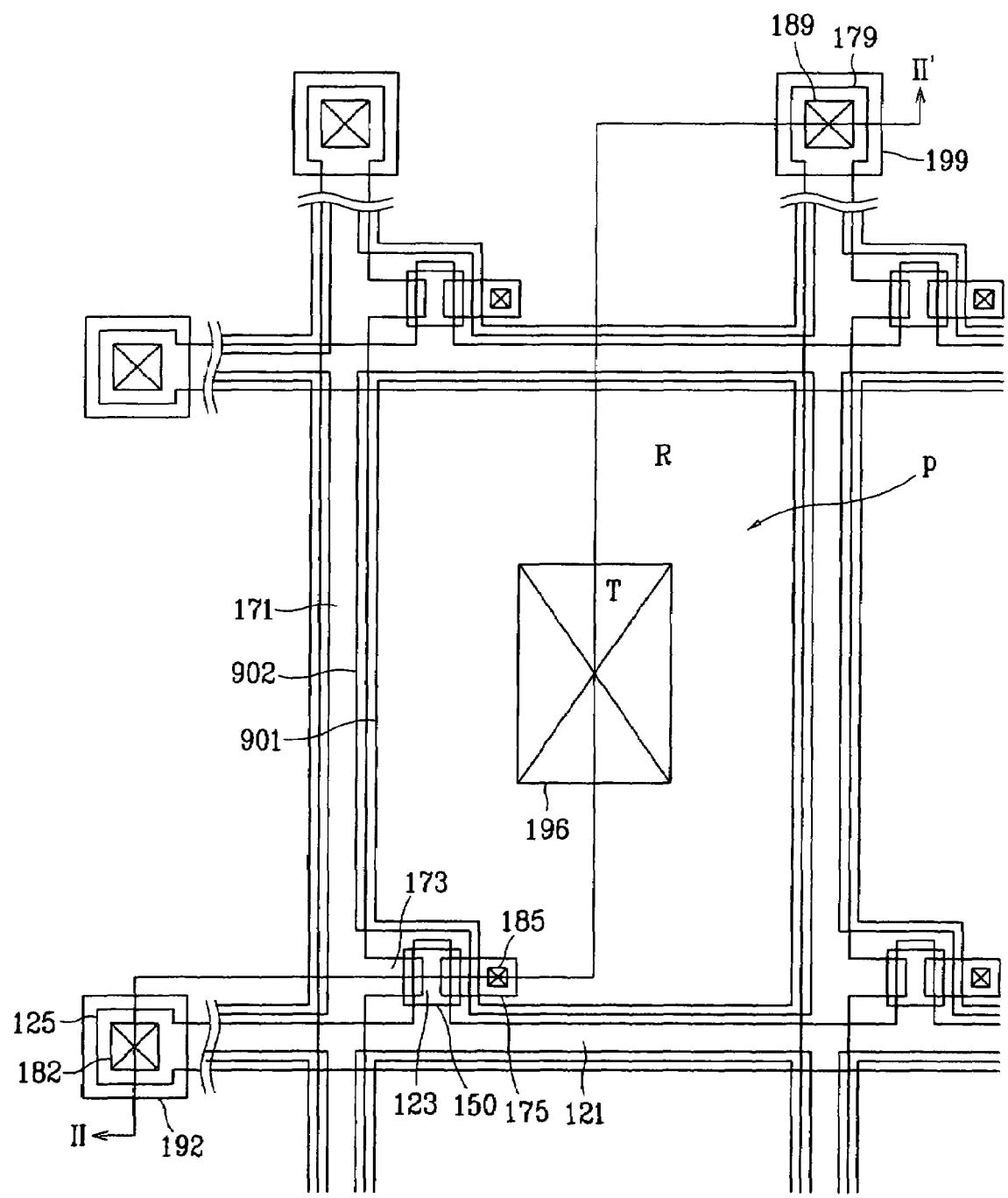
FIG. 1 is a layout view of a TFT array panel for a transflective LCD according to an embodiment of the present invention.
Figure 2:
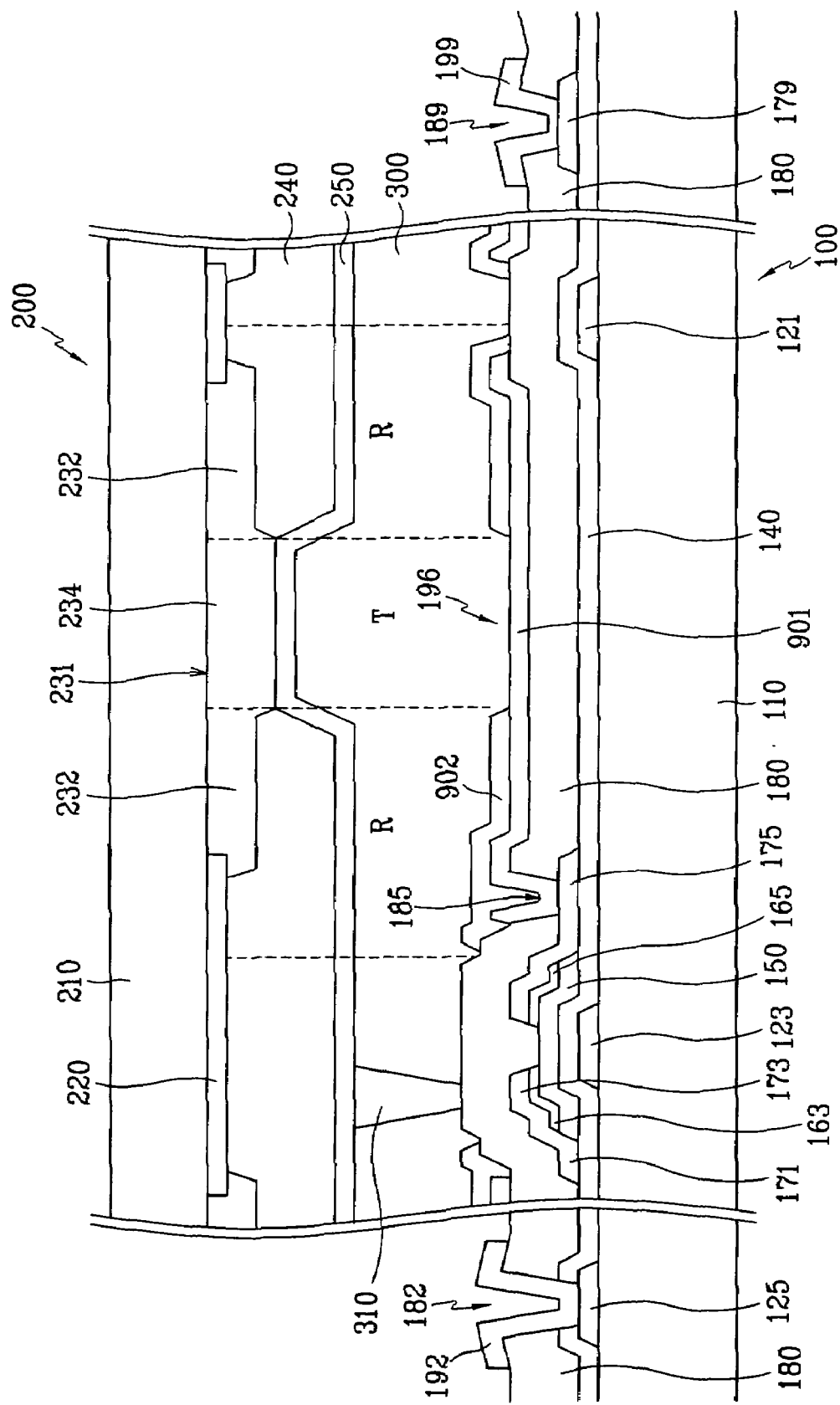
FIG. 2 is a sectional view of an LCD including the TFT array panel shown in FIG. 1 taken along the line II-II'.

FIG. 1 is a layout view of a TFT array panel for a transflective LCD according to an embodiment of the present invention, and FIG. 2 is a sectional view of an LCD including the TFT array panel shown in FIG. 1 and a color filter panel according to the embodiment of the present invention taken along the line II-II'.

As shown in FIGS. 1 and 2, an LCD according to an embodiment of the present invention includes two panels 100 and 200 that face each other, spacers 310 for that maintain the gap between the two panels 100 and 200, and a liquid crystal layer 300 interposed between the two panels 100 and 200. The spacers 310 are made of organic insulating material and formed by a photolithography process.

A plurality of gate lines 121 and a plurality of data lines 171, which intersect each other to define a plurality of pixel areas P arranged in a matrix, are formed on the lower panel 100. In each pixel area P, a TFT is connected to the gate and the data lines 121 and 171, and a pixel electrode is electrically connected to the TFT. Each pixel electrode includes a transparent electrode 901 preferably made of transparent conductive film and a reflecting electrode 902 preferably made of reflective conductive film and having a transmitting window 196. An area occupied by the transmitting window 196 is referred to as a "transmissive area" T, while the remaining area of the pixel area P is referred to as a "reflective area" R. In addition, areas of the lower panel corresponding to the transmissive area T and the reflective area R are referred to as the same names and numerals hereinafter.

A black matrix 220 having openings corresponding to the pixel areas P is formed on the upper panel 200, which faces the lower panel 100. Red, green or blue color filters 231 are formed in each pixel area P. The color filters 231 are covered with an upper passivation film 240, which are covered with a common electrode 250. Each of the red, green and blue color filters 231 have a portion 232 located in the reflective area R and a portion 234 located in the transmissive area T. In this embodiment, the portion 234 in the transmissive area T has a larger thickness than the portion 232 in the reflective area R. The upper passivation film has a portion located in the reflective area R with a thickness different from another portion in the transmissive area. In this embodiment, the organic insulating material of the portion in the transmissive area T has been removed.

The reflective area R is mainly used for displaying images utilizing the light reflected from the reflecting electrode 902, while the transmissive area T is mainly used for displaying images utilizing the light from a backlight.

In the LCD according to the present embodiment of the invention, the images in the transmissive area T are generated by light that passes through the liquid crystal layer 300 only once, while those in the reflective area R are generated by light that reaches the reflecting electrode 902 after passing through the liquid crystal layer 300 once and then passing through the liquid crystal layer 300 again after being reflected by the reflecting electrode 902. Since the thickness of the upper passivation film 240 in the reflective area R is larger than that in the transmissive area T, the amount of light transmitted through the liquid crystal layer 300 in the area R is almost the same as the amount of light transmitted through the liquid crystal layer 300 in the area T. The retardation of light through the two areas T and R can be equalized, thereby improving the display characteristics of the LCD. For example, in an ECB (electrically controlled birefringence) mode LCD which has a variable cell gap, the path of light for displaying an image can be equalized by controlling the path d of the light passing through the liquid crystal layer in the transmissive area T and the reflective area R to satisfy the equation $\Delta\ nd=\lambda/2$, where $\lambda$ is the wavelength of the light.

In the LCD according to the present embodiment of the invention, images in the transmissive area T are generated by light that passed through the color filter 231 only once, while those in the reflective area R are generated by light that reaches the reflecting electrode 902 after passing through the color filter 231 once and then passing through the color filter 231 again after being reflected by the reflecting electrode 902. Since the thickness of the color filter 231 in the reflective area R is smaller than that in the transmissive area T, the amount of light transmitted through the liquid crystal layer 300 in the area R is almost the same as the amount of light transmitted through the liquid crystal layer 300 in the area T. Accordingly, color reproduction properties for the two areas T and R can be equalized, thereby improving display characteristics of the LCD.

The lower panel 100 includes an insulating substrate 110. A plurality of gate lines 121 extending substantially transverse to the data lines 171 are formed on the substrate 110. Each gate line 121 has a single-layered structure preferably made of a material having low resistivity, such as, for example, silver, silver alloy, aluminum or aluminum alloy. Alternatively, each gate line 121 has a multiple-layered structure including a layer or layers made of the above listed materials, and preferably including at least one layer having good contact characteristic with another material. A portion 125 near one end of each gate line 121 transmits gate signals from an external device to the gate line 121, and a plurality of branches of each gate line 121 serve as gate electrodes 123 of TFTs.

A gate insulating layer 140 preferably made of silicon nitride (SiNx) or the like covers the gate lines 121.

A plurality of semiconductor islands 150 preferably made of hydrogenated amorphous silicon are formed on the gate insulating layer 140 opposite the gate electrode 123. A plurality of pairs of ohmic contacts 163 and 165 preferably made of silicide or n+hydrogenated amorphous silicon heavily doped with n type impurity are formed on the semiconductor islands 150. The ohmic contacts 163 and 165 are separated from one another at each corresponding gate electrode 123.

A plurality of data lines 171 and a plurality of drain electrodes 175 are formed on the ohmic contacts 163 and 165 and the gate insulating layer 140. The data lines 171 and the drain electrodes 175 preferably include a conductive material having low resistivity such as aluminum or silver.

A plurality of branches of the data lines 171 extend to the upper surfaces of the ohmic contacts 163 of the respective pairs of the ohmic contacts 163 and 165 to form a plurality of source electrodes 173 of the TFTs. A portion 179 near one end of each data line 171 transmits data signals from an external source to the data line 171. The drain electrodes 175 of the TFTs are separated from the data lines 171 and located on the ohmic contacts 165 of the respective pairs of the ohmic contacts 163 and 165 opposite the source electrodes 173.

A lower passivation layer 180 preferably made of silicon nitride or organic material with good planarizability is formed on the data lines 171, the drain electrodes 175 and portions of the semiconductor islands 150 that are not covered by the data lines 171 or the drain electrodes 175.

A plurality of contact holes 185 and 189 that respectively expose the drain electrodes 175 and the end portions 179 of the data lines 171 are formed through the lower passivation layer 180, and a plurality of other contact holes 182 that expose the end portions 125 of the gate lines 121 are formed in the lower passivation layer 180 and the gate insulating layer 140.

A plurality of transparent electrodes 901 electrically connected to the drain electrodes 175 via the contact holes 185 are formed on the lower passivation layer 180 in the pixel areas P. In addition, a plurality of gate contact assistants 192 and a plurality of data contact assistants 199 respectively connected to the end portions 125 of the gate lines 121 via the contact holes 182 and to the end portions 179 of the data lines 171 via the contact holes 189 are formed on the lower passivation layer 180. The transparent electrodes 901 and the contact assistants 192 and 199 are preferably made of transparent conductive material such as ITO (indium tin oxide) or IZO (indium zinc oxide).

A plurality of reflecting electrodes 902 are formed on transparent electrodes 901. Each of the reflecting electrodes 902 has a transmitting window 196. The reflecting electrodes 902 are preferably made of a conductive film having high reflectance such as aluminum, aluminum alloy, silver, silver alloy, molybdenum, or molybdenum alloy. The reflecting electrodes 902 preferably have embossments due to the unevenness of the underlying lower passivation layer 180, which enhances reflectance of the reflecting electrode 902. A pair of one of the reflecting electrodes 902 and the transparent electrode 901 thereunder form a pixel electrode. The transmitting windows 196 of the reflecting electrodes 902 can have a variety of shapes, and the number of transmitting windows 196 in a pixel area is not limited to one but may be equal to or more than two.

Each electrode 901 and 902 overlaps one of the gate lines 121, which transmits a gate signal to TFTs of a pixel row adjacent thereto, to form a storage capacitor. If the storage capacitance of the storage capacitor is too small, another storage capacitor formed of a conductor made of the same layer as the gate lines 121 and the electrodes 901 and 902 or another conductor connected to the electrodes 901 and 902 can be added.

Figure 3A:
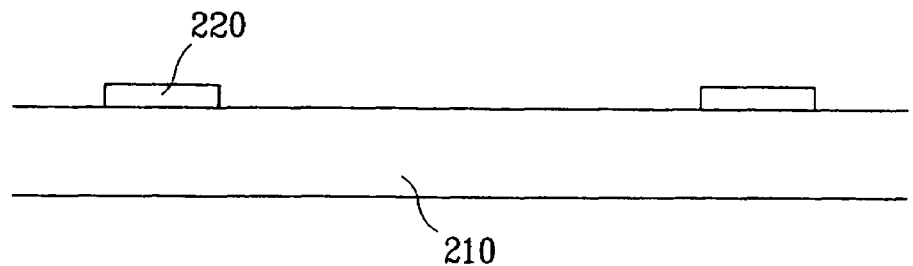
FIGS. 3a-3d are sectional views of a color filter panel of a transflective LCD in the steps of a manufacturing method according to an embodiment of the present invention.
Figure 3B:
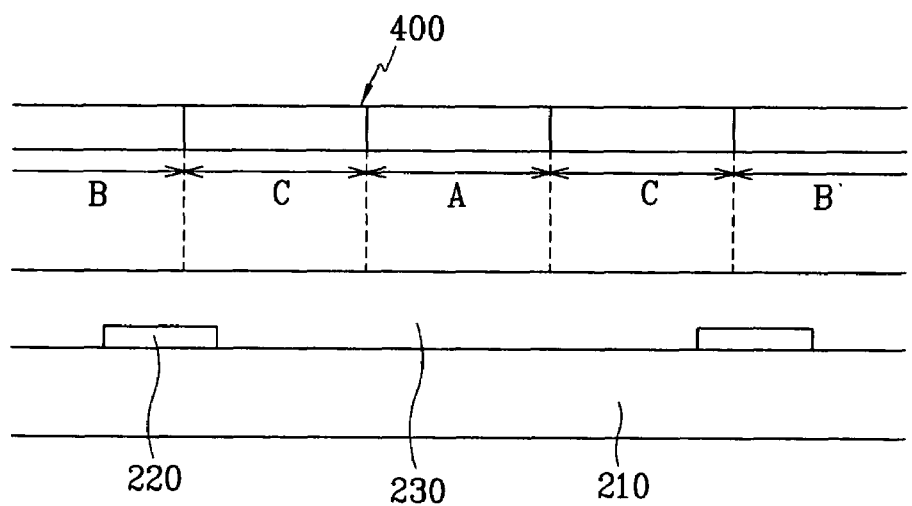
Figure 3C:
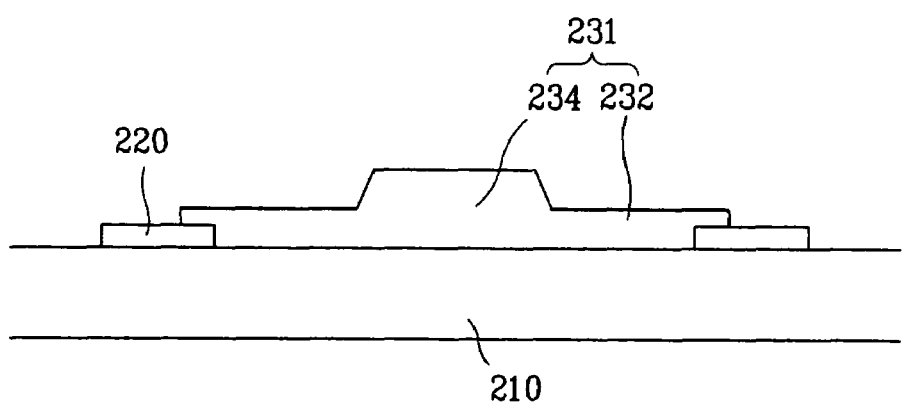
Figure 3D:
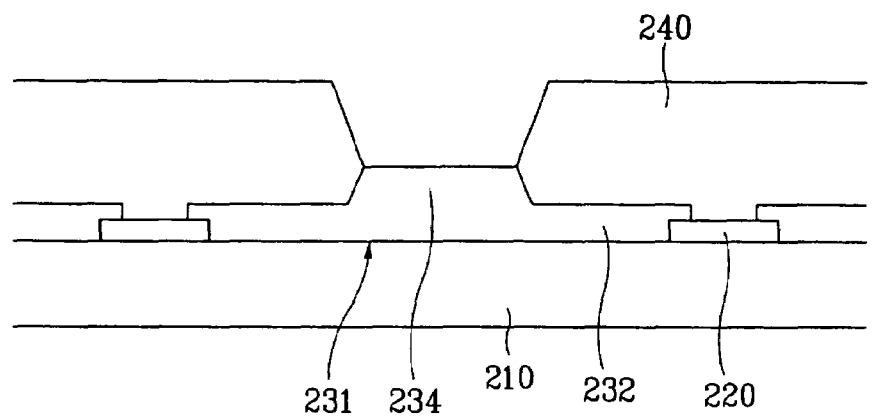
Figure 4:
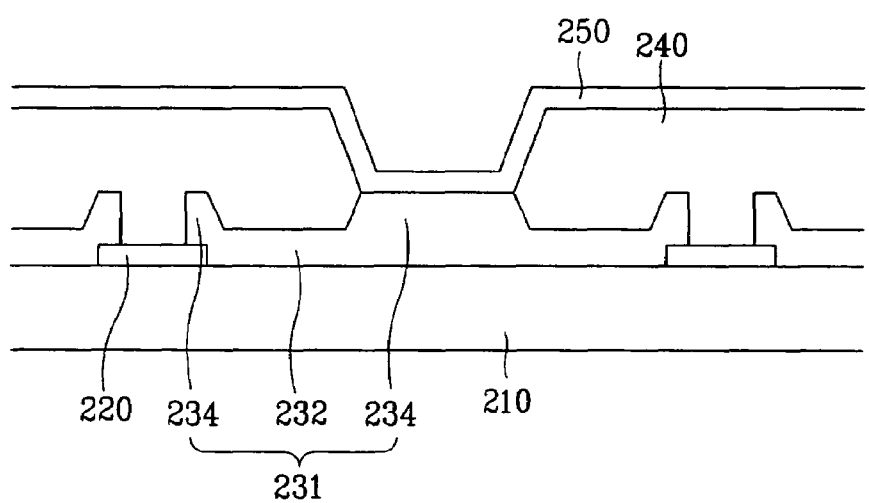
FIGS. 4 and 5 are sectional views of color filter panels of a transflective LCD according to other embodiments of the present invention.
Figure 5:
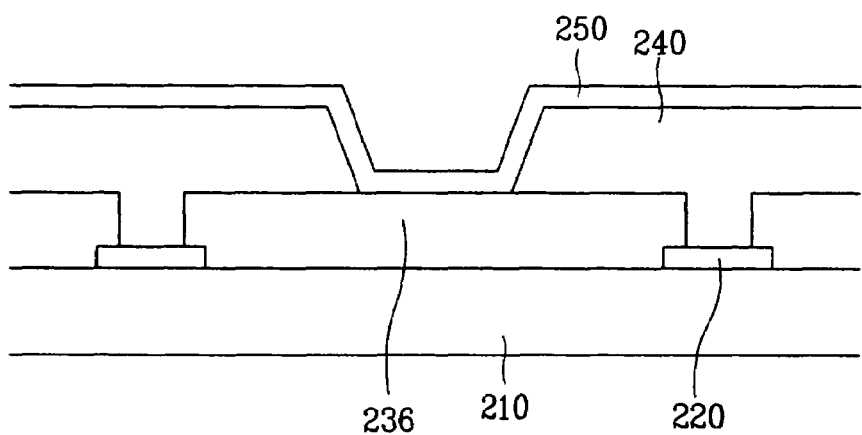

FIGS. 3a through 3d are sectional views of a color filter panel in the steps of a manufacturing method according to an embodiment of the present invention, and FIGS. 4 and 5 are sectional views of color filter panels according to other embodiments of the present invention.

As shown in FIG. 3a, a black matrix 220 is formed by depositing a material having good light-blocking characteristics over the upper surface of an upper insulating substrate 210 and patterning the deposited material through photolithography using a photomask.

As shown in FIG. 3b, a negative photosensitive film 230 is coated on the upper surface of the upper insulating substrate 210. The negative photosensitive film 230 is a water-insoluble dispersion solution containing a photopolymerizable photosensitive composition including photopolymerization initiators, monomers, binders, etc., and one of red, green and blue pigments. The photosensitive film 230 is exposed to light through a mask 400 which can vary the energy absorbed by the photosensitive film 230 for different areas A, B and C.

The photopolymerization of the exposed portions of the negative photosensitive film 230 results in insolubility of the portions to an alkali developing solution. The photopolymerization initiators are activated to free-radical initiators upon exposure to the light, the free-radical initiators induce the monomers to generate free-radical monomers, and then the radical monomers are polymerized to polymers through chain-reaction polymerization. As a result, the exposed portions of the photosensitive film 230 become insoluble.

In this embodiment, the thickness of the photosensitive film 230 is varied throughout an area of the photosensitive film 230 by changing the degree of insolubility of the photosensitive film 230 to the developing solution over the area. The degree of insolubility can be changed throughout an area by using the mask 400, which can vary the exposure energy absorbed by the photosensitive film 230.

The initial energy is almost fully transferred to portions of the photosensitive film 230 in the area A, while the initial energy is almost fully blocked from the area B. Portions of the photosensitive film 230 in the area C receive part of the initial energy having a flux in the range of about 10 mJ/cm$^2$ to about 140 mJ/cm$^2$.

The area C can be obtained by using a mask 400 having a translucent portion with a slit pattern or a lattice pattern. When using a slit pattern, it is preferable that the width of the slits or the distance between the slits is smaller than the resolution of an exposer used in this step. Alternatively, the mask 400 with a translucent portion is obtained by making the thickness of a layer thereon to be different depending on the position or by using a plurality of layers having different transmissivity.

When exposed to light through the mask 400, the portions in the area C are polymerized in part, preferably about 20-60% polymerized.

The photosensitive film 230 is developed using an alkali solution. As shown in FIG. 3c, a color filter 231 having two portions 232 and 234 with different thickness is obtained.

An array of color filters is obtained by repeatedly performing the above steps for red, green and blue color filters. Although this embodiment of the present invention uses a single mask 400 that provides different exposure energies depending on the location on the mask, two or more masks can be used in other embodiments of the invention, with each mask providing a different exposure energy.

As shown in FIG. 3d, an upper passivation layer 240 is formed overt he substrate 210. The upper passivation layer can be formed by any suitable method, such as, for example, by spin coating organic material on the substrate 210. A portion corresponding to the transmissive area T, that is, the portion on the first portion 234 of the color filter 231, is removed through a photolithography process using a mask. Instead of removing the whole portion of the upper passivation layer 240 in the transmissive area T. a part of the upper passivation layer 240 can be removed in the transmissive area T by using a mask that selectively controls light transmittance in the transmissive area T and the reflective area R.

As shown in FIGS. 1 and 2, a common electrode 250, preferably made of a transparent conductive material such as ITO and IZO, is formed on the color filter 231 and the upper passivation layer 240 to complete the color filter panel 200 (FIG. 2).

As shown in FIG. 4, in a color filter panel for an LCD and a manufacturing method according to another embodiment of the present invention, edge portions 235of the color filter 231 overlapping the black matrix 220 have substantially the same thickness as the first portion 234. The area A is located at a position between the areas B and C in the mask 400. This makes the thickness of the second portion 232 of the color filter 231 in the area C uniform, and prevents the edges of the portion 232 of the color filter 231 from being detached when developing.

As shown in FIG. 5, in a color filter panel for an LCD and a manufacturing method according to another embodiment of the invention, the thickness of the color filters 236 in the transmissive area T and the reflective area R can be the same.

A manufacturing method of a TFT array panel according to an embodiment of the present invention is described in detail with reference to FIGS. 6a-10b as well as FIGS. 1 and 2.

Figure 6A:
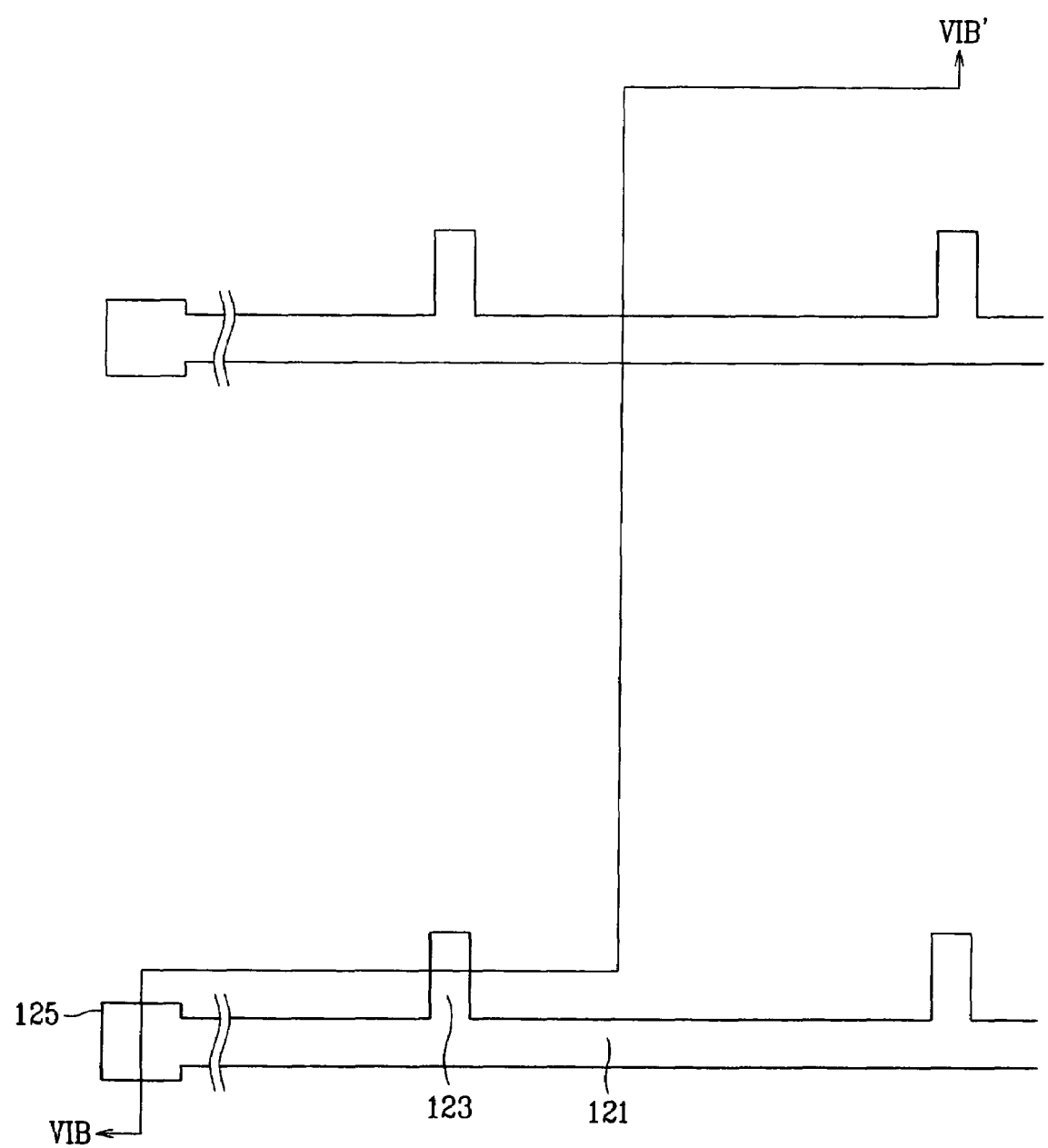
FIGS. 6a, 7a, 8a, 9a, and 10a are layout views of a TFT array panel of a transflective LCD in the steps of a manufacturing method according to an embodiment of the present invention.
Figure 6B:
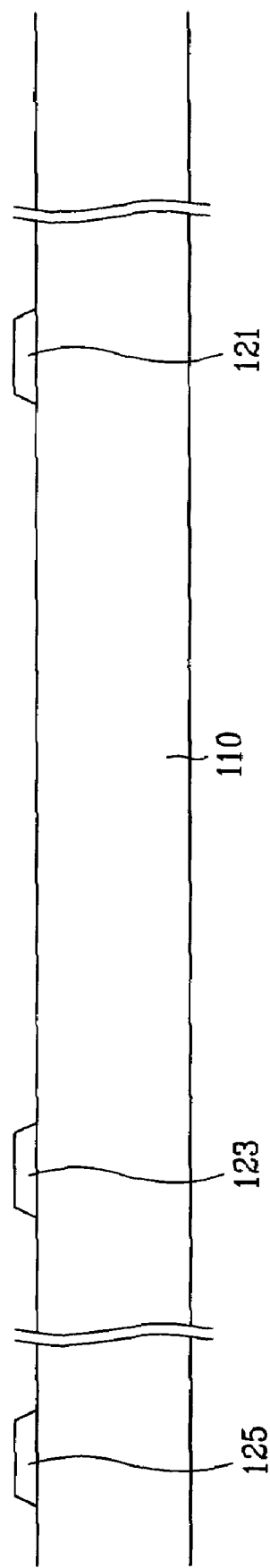
FIG. 6b is a sectional view of the TFT array panel shown in FIG. 6a taken along the line VIb-VIb'.

As shown in FIGS. 6a and 6b, a conductive material having low resistivity is deposited on an upper surface of a lower insulating substrate 110 and patterned to form a plurality of gate lines 121 including a plurality of gate electrodes 123.

Figure 7A:
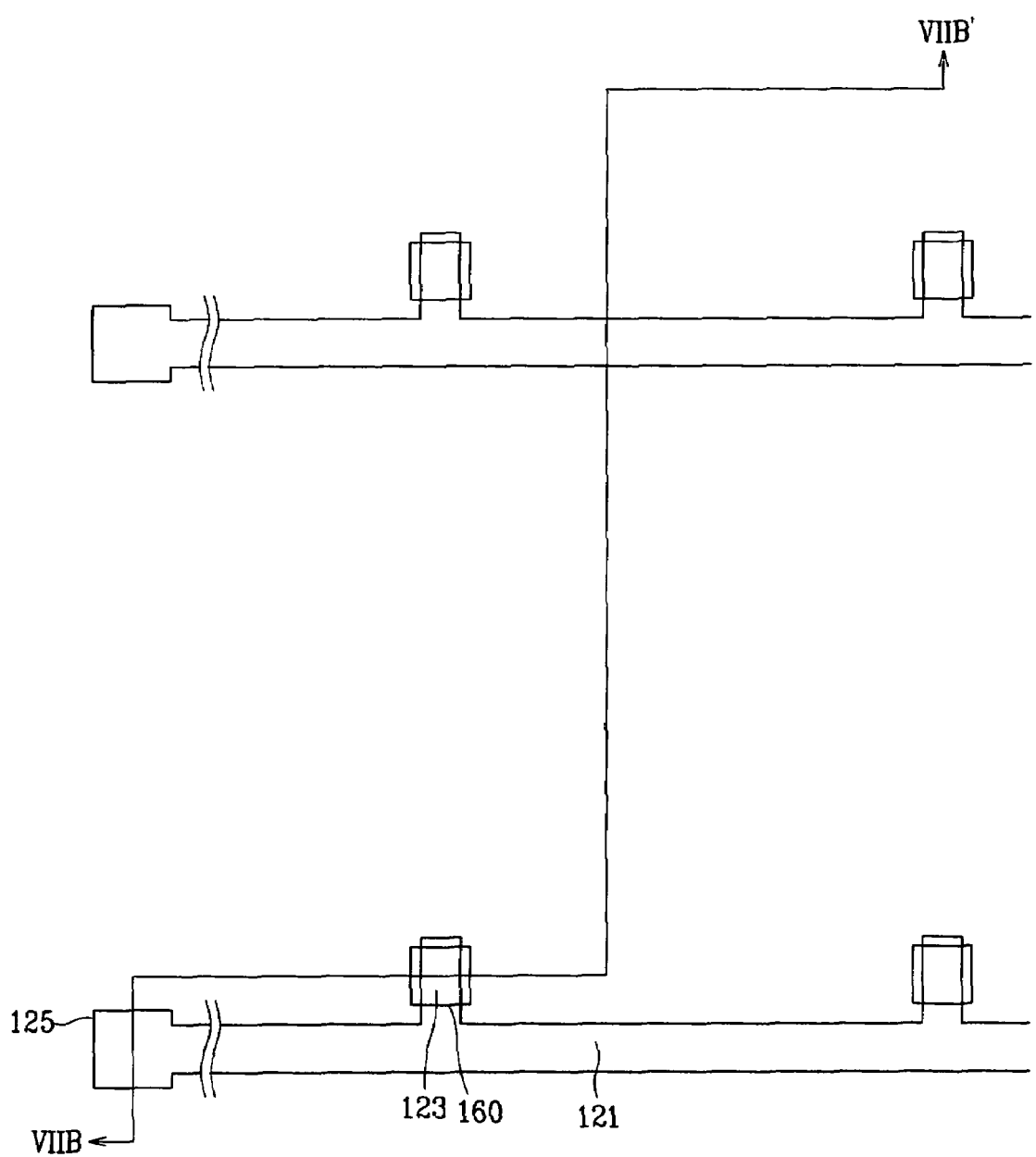
Figure 7B:
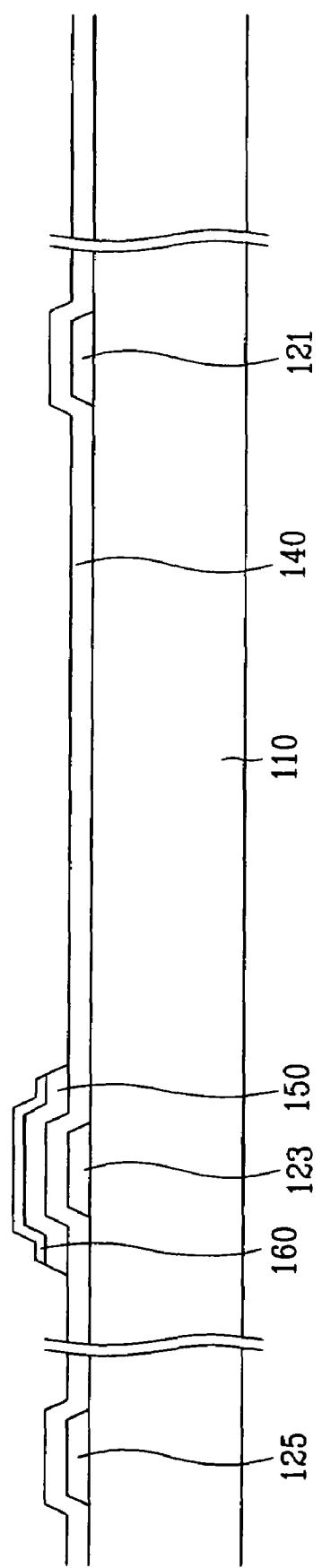
FIG. 7b is a sectional view of the TFT array panel shown in FIG. 7a taken along the line VIIb-VIIb'.

A gate insulating layer 140 preferably made of silicon nitride, a semiconductor layer preferably made of amorphous silicon, and a doped amorphous silicon layer are deposited in sequence. The upper two layers of the semiconductor layer and the doped amorphous silicon layer are patterned in sequence using a photomask to form a plurality of semiconductor islands 150 and a plurality of doped amorphous silicon islands 160 over the gate electrode 123, as shown in FIGS. 7a and 7b.

Figure 8A:
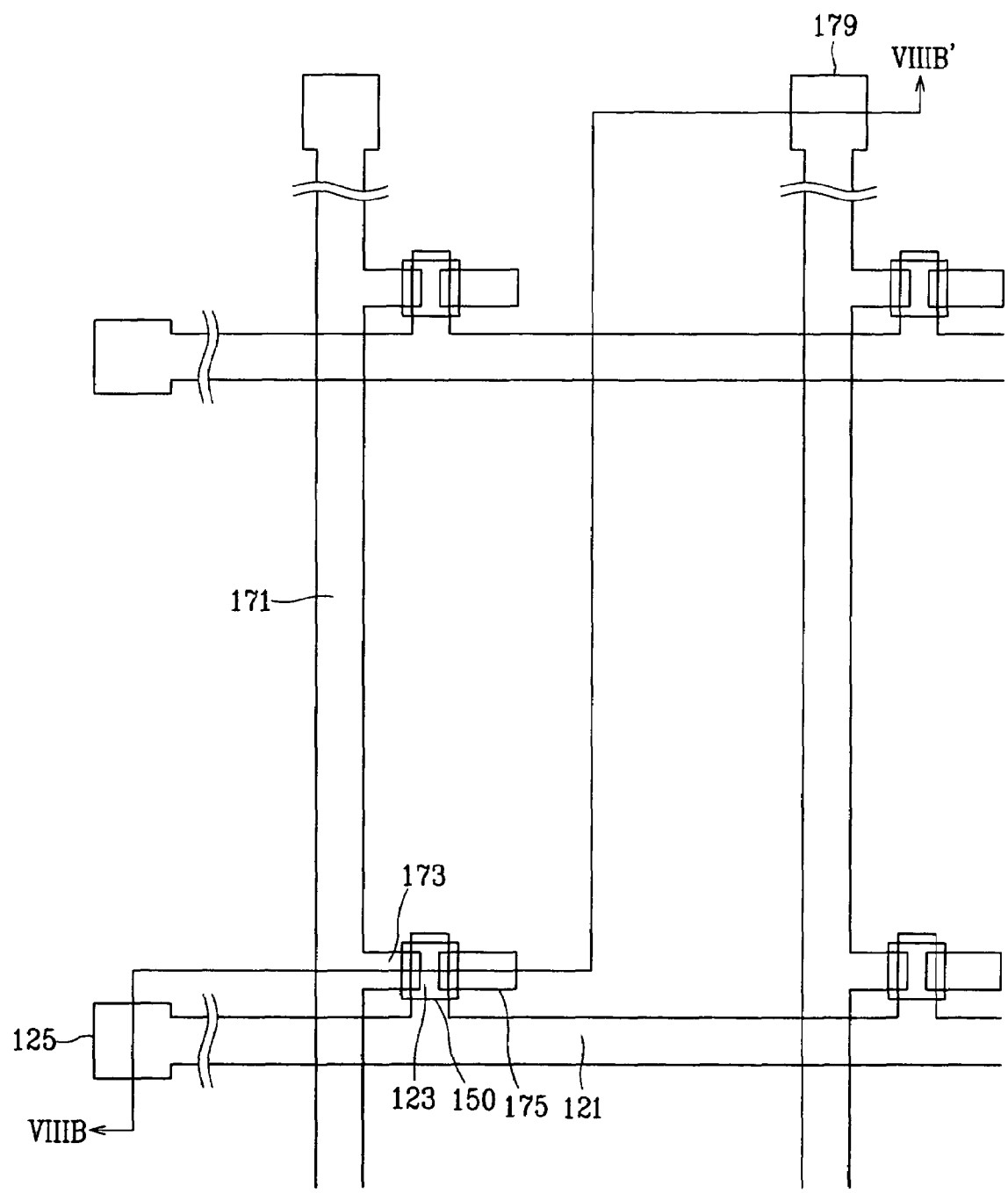
Figure 8B:
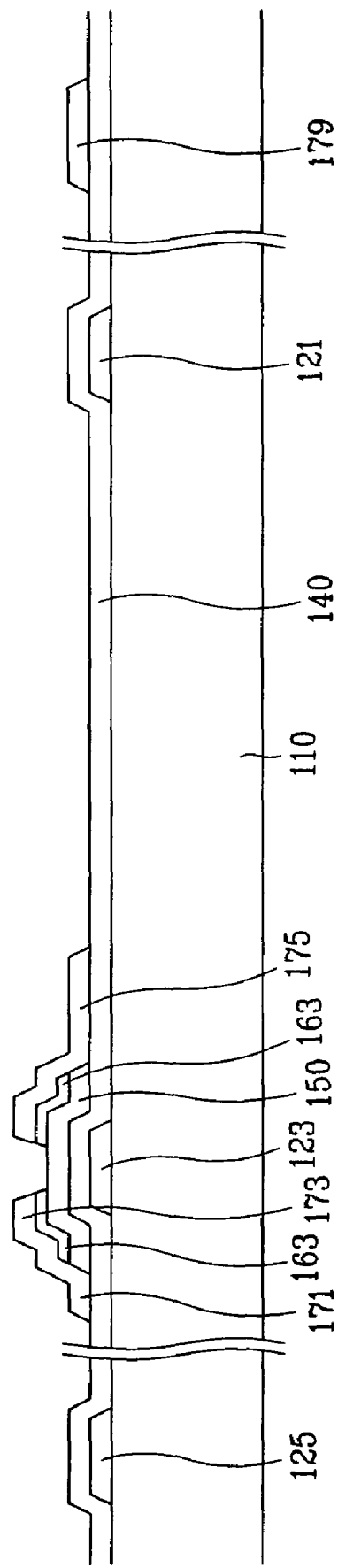
FIG. 8b is a sectional view of the TFT array panel shown in FIG. 8a taken along the line VIIIb-VIIIb'.

As shown in FIGS. 8a and 8b, a conductive layer is deposited and patterned using photolithography to form a plurality of data lines 171 intersecting the gate lines 121 and a plurality of drain electrodes 175. Each data line 171 includes a plurality of source electrodes 173 extending to an upper surface of the corresponding doped amorphous silicon islands 160. The drain electrodes 175 are disposed separate from the data lines 171 and opposite to the related source electrodes 173.

Portions of the doped amorphous silicon islands 160, which are not covered with the data lines 171 and the drain electrodes 175, are removed so that each doped amorphous silicon island 160 is divided into two ohmic contacts 163 and 165 and portions of the semiconductor island 150 under the removed portions of the doped amorphous silicon island 160 are exposed. It is preferable to perform oxygen plasma treatment to stabilize the surface of the exposed portions of the semiconductor islands 150.

Figure 9A:
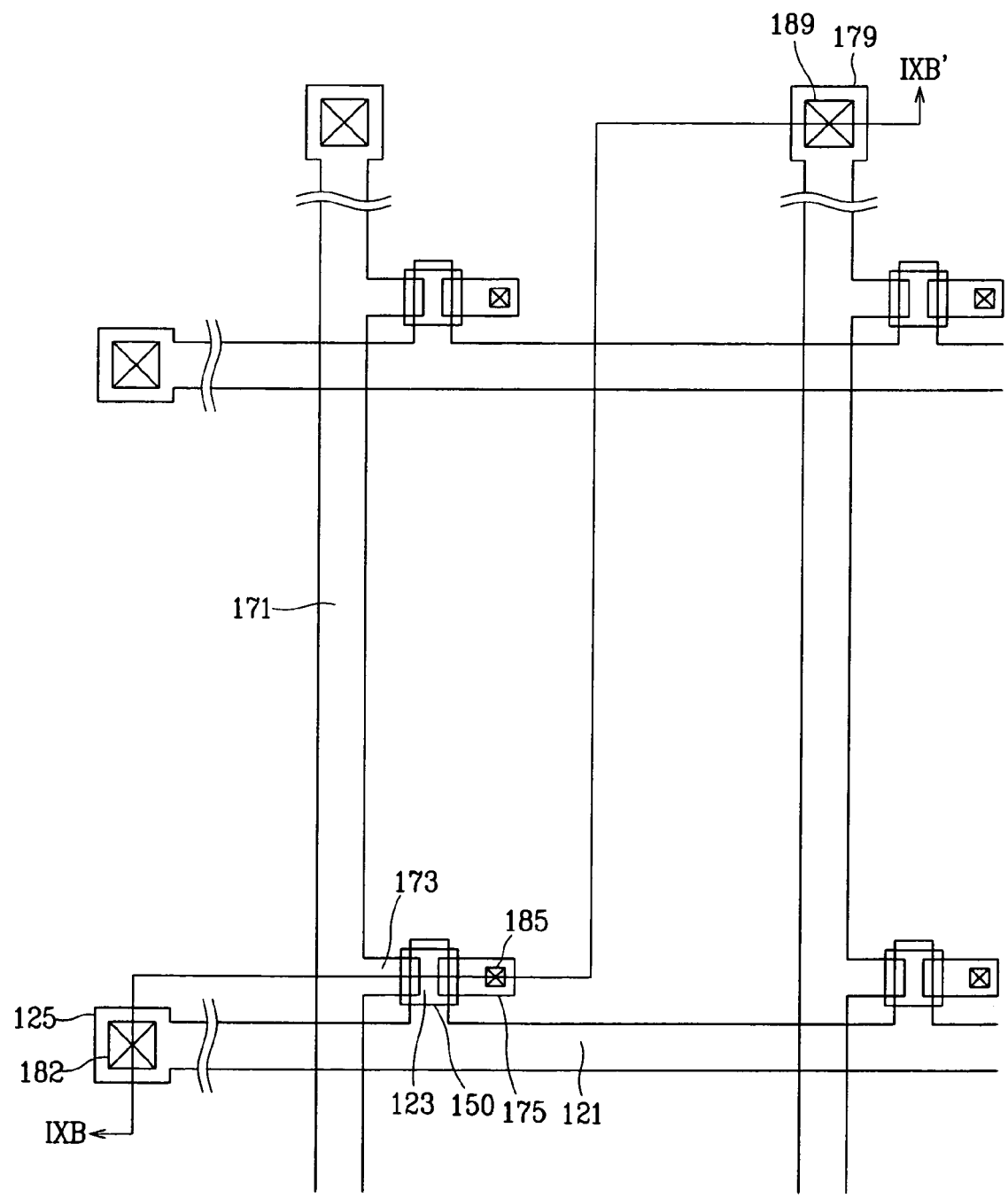
Figure 9B:
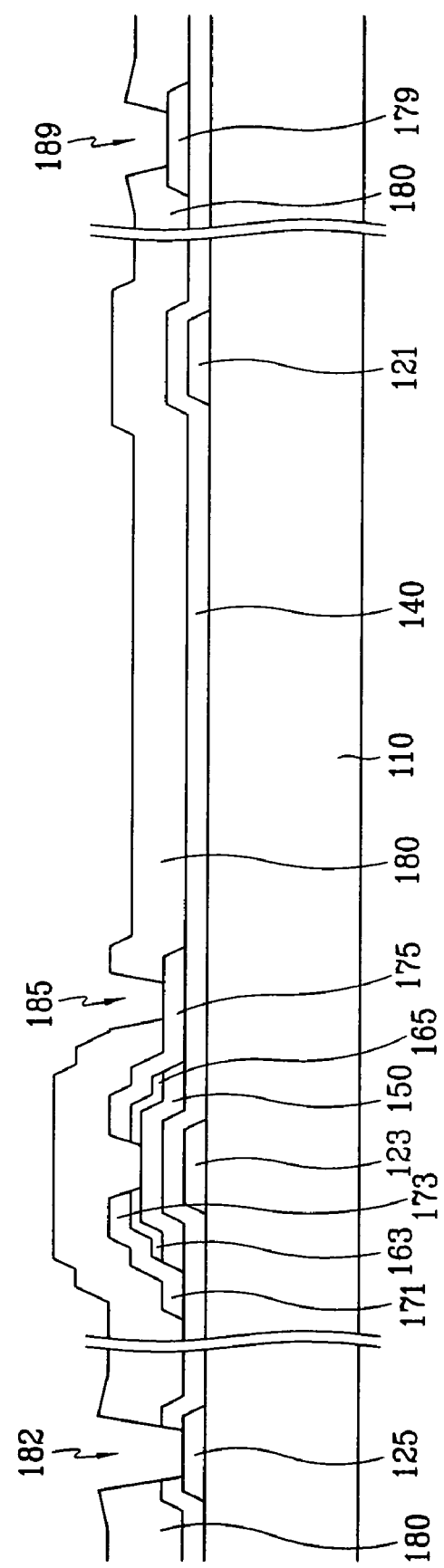
FIG. 9b is a sectional view of the TFT array panel shown in FIG. 9a taken along the line IXb-IXb'.

A lower passivation layer 180 is formed by deposition of organic material with low dielectric constant and good planarizability or insulating material such as silicon nitride. As shown in FIGS. 9a and 9b, the lower passivation layer 180 and the gate insulating layer 140 are patterned by dry etching using photolithography to form a plurality of contact holes 182, 185, and 189. The contact holes 182, 185 and 189 expose end portions 125 of the gate lines 121, the drain electrodes 175 and end portions 179 of the data lines 171, respectively.

Figure 10A:
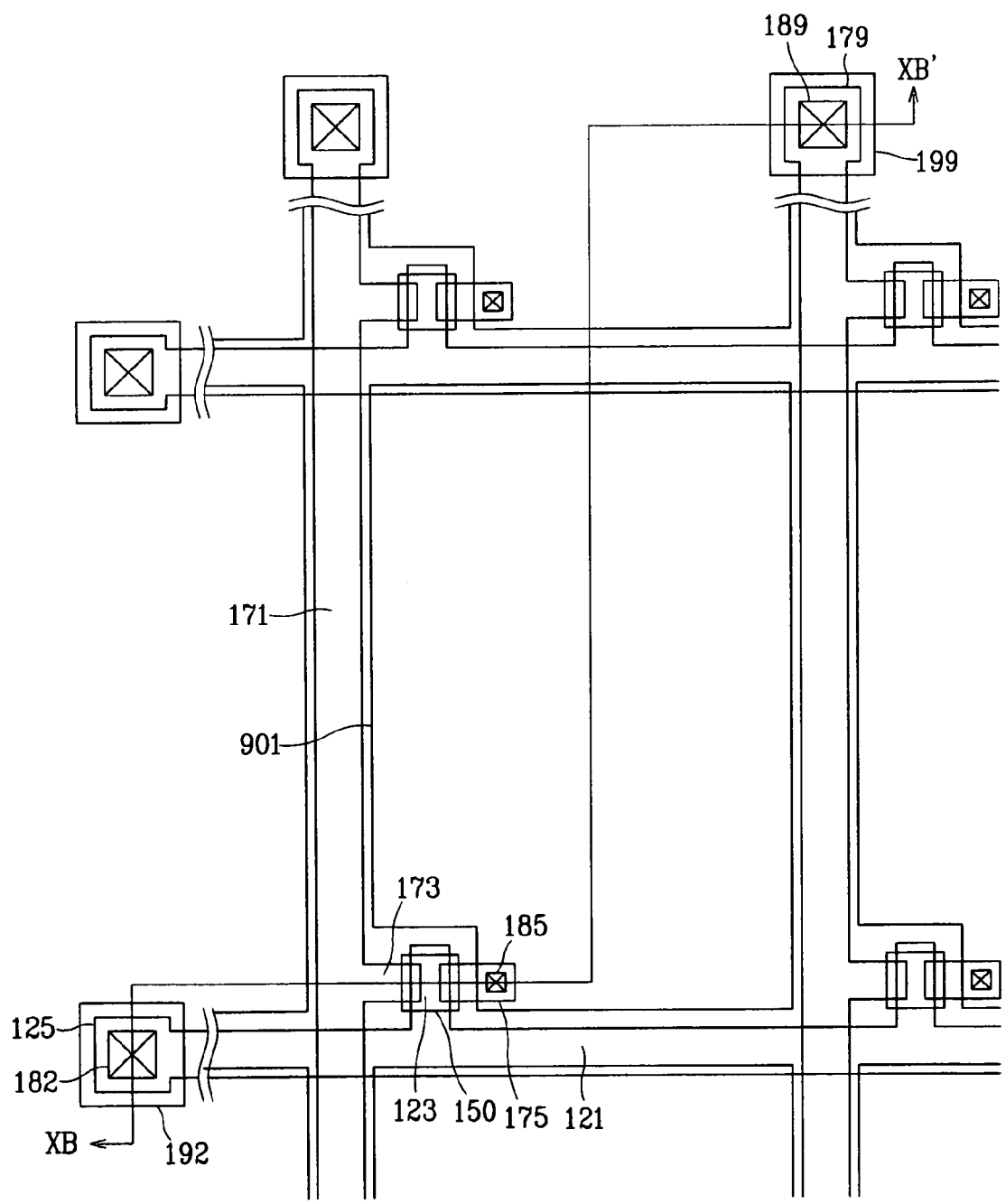
Figure 10B:
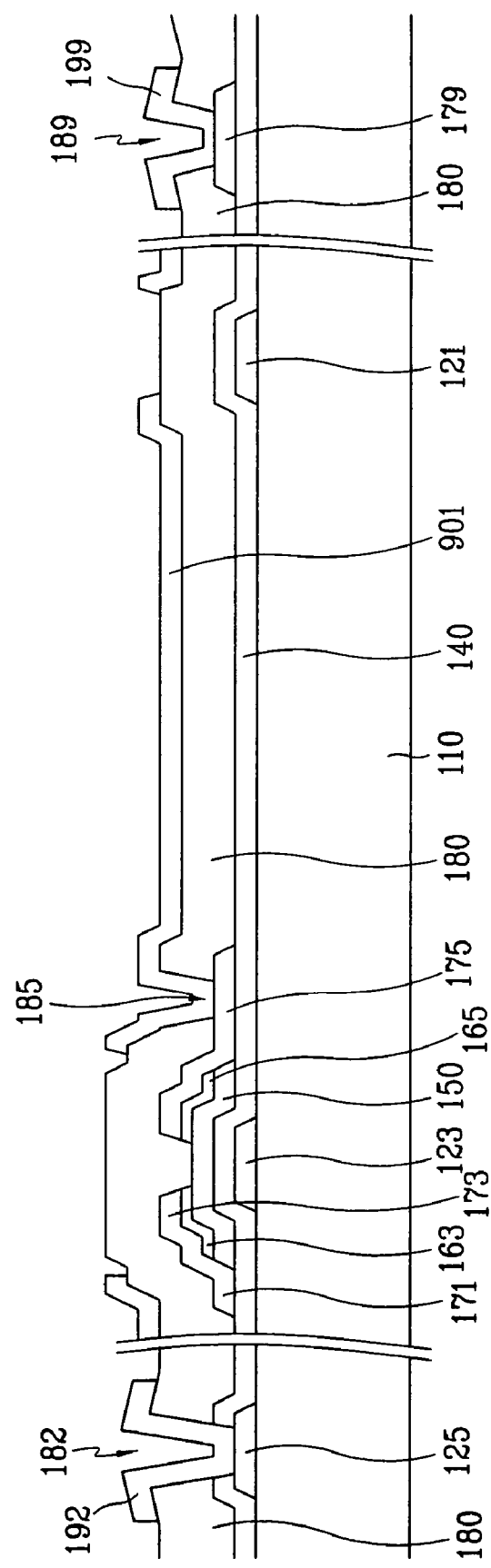
FIG. 10b is a sectional view of the TFT array panel shown in FIG. 10a taken along the line Xb-Xb'.

As shown in FIGS. 10a and 10b, an ITO layer or an IZO layer is deposited and patterned using a photomask to form a plurality of transparent electrodes 901 connected to the associated drain electrodes 175 via the contact holes 185, and a plurality of gate contact assistants 192 and data contact assistants 199 connected to the end portions 125 of the gate lines 121 and the end portions 179 of the data lines 171 via the contact holes 182 and 189, respectively.

As shown in FIGS. 1 and 2, a plurality of reflecting electrodes 902, each having a transmitting window 196, are formed by depositing and patterning a conductive layer with high reflectance such as aluminum, silver, or molybdenum.

While the present invention has been described in detail with reference to the preferred embodiments, it is to be understood that the invention is not limited to the disclosed embodiments, but, on the contrary, is intended to cover various modifications and equivalent arrangements included within the spirit and scope of the appended claims.

In various exemplary embodiments of the invention, the degree of phase retardation that the light for displaying an image experiences in each area can be equalized by forming the passivation layer in the transmissive area with a smaller thickness than in the reflective area. The display quality in the transmissive area and the reflective area of a liquid crystal display is improved by controlling the distance between the panels in the transmissive area and in the reflective area to satisfy the equation $\Delta nd = \lambda/2$, where $\lambda$ is the wavelength of light.

What is claimed is:

1. A color filter panel for a liquid crystal display, comprising:
    a substrate;
    a color filter formed over the substrate; and
    a passivation layer that covers the color filter and that has a varying thickness,
    wherein the color filter includes first and second portions with different thickness, the first portion has a larger thickness and the second portion has a smaller thickness, and the second portion is located along a line that a pixel area is defined by, and the first portion is located within an area surrounded by the second portion,
    wherein the liquid crystal display includes a first display area that displays images using a light source provided therein and a second display area that displays images using an external light.

2. The color filter panel of claim 1, wherein the thickness of the passivation layer in the first display area is smaller than the thickness of the passivation layer in the second display area.

3. The color filter panel of claim 2, wherein the thickness of the passivation layer in the first display area is zero (0).

4. The color filter panel of claim 1, wherein the second portion with the smaller thickness of the color filter is located in an area corresponding to the second display area, and the first portion with the larger thickness of the color filter is located in an area corresponding to the first display area.

5. The color filter panel of claim 1, wherein a light-blocking member is located near the edge of the color filter.

6. The color filter panel of claim 5, wherein a portion of the color filter overlapping the light-blocking member has a thickness smaller than the thickness of the second portion with the smaller thickness of the color filter.

7. The color filter panel of claim 1, further comprising a common electrode formed over the substrate.

8. A color filter panel for a liquid crystal display, comprising:
- a substrate;
- a color filter formed over the substrate; and
- a passivation layer that covers the color filter and that has a varying thickness,
- wherein the color filter includes first and second portions with different thickness, the first portion has a larger thickness and the second portion has a smaller thickness, and the second portion is located along a line that a pixel area is defined by, and the first portion is located within an area surrounded by the second portion,
- wherein a light-blocking member is located near the edge of the color filter, and a portion of the color filter overlapping the light-blocking member has a thickness smaller than the thickness of the second portion with the smaller thickness of the color filter.

* * * * *